(12) United States Patent
Kim et al.

(10) Patent No.: US 11,845,359 B2
(45) Date of Patent: Dec. 19, 2023

(54) BATTERY COOLING SYSTEM CONTROL METHOD FOR VEHICLE

(71) Applicants: HYUNDAI MOTOR COMPANY, Seoul (KR); KIA CORPORATION, Seoul (KR)

(72) Inventors: Jae Yeon Kim, Hwaseong-si (KR); Jeawan Kim, Hwaseong-si (KR); Wan Je Cho, Hwaseong-si (KR); Yeonho Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/838,545

(22) Filed: Jun. 13, 2022

(65) Prior Publication Data
US 2023/0202346 A1   Jun. 29, 2023

(30) Foreign Application Priority Data
Dec. 28, 2021  (KR) .................. 10-2021-0190012

(51) Int. Cl.
*B60L 58/26* (2019.01)
*H01M 10/663* (2014.01)
(Continued)

(52) U.S. Cl.
CPC .......... *B60L 58/26* (2019.02); *B60H 1/00278* (2013.01); *H01M 10/486* (2013.01); *H01M 10/613* (2015.04); *H01M 10/625* (2015.04); *H01M 10/63* (2015.04); *H01M 10/6567* (2015.04); *H01M 10/663* (2015.04); *B60H 2001/00307* (2013.01);
(Continued)

(58) Field of Classification Search
CPC .............. B60L 58/26; B60L 2240/545; H01M 10/613; H01M 10/625; H01M 10/63; H01M 10/6567; H01M 10/663; H01M 10/486; H01M 2220/20; B60H 1/00278; B60H 2001/00307; B60H 2001/3285; B60K 2001/005
See application file for complete search history.

(56) References Cited

U.S. PATENT DOCUMENTS 7,147,071 B2 *  12/2006  Gering .................... B60H 1/08
                                                          165/41
9,701,215 B1 *  7/2017  Kim ....................... B60L 58/33
(Continued)

*Primary Examiner* — Tho V Duong
*Assistant Examiner* — Raheena R Malik
(74) *Attorney, Agent, or Firm* — MCDONNELL BOEHNEN HULBERT & BERGHOFF LLP

(57) ABSTRACT

A battery cooling system control method for a vehicle includes a process (A) of measuring by a controller a temperature of a battery based on data detected from a data detector while the vehicle is driving, determining by the controller whether the measured battery temperature is higher than a preset target temperature, and if a condition is not satisfied, cooling the battery using a coolant cooled in a radiator, and a process (B) of, if it is determined through the process (A) that the temperature of the battery is higher than the target temperature (i.e., if the condition is satisfied), operating an air conditioner to cool the battery using a coolant heat-exchanged with a refrigerant while passing through a chiller, and terminating control.

8 Claims, 3 Drawing Sheets

(51) Int. Cl.
*H01M 10/6567* (2014.01)
*B60H 1/00* (2006.01)
*H01M 10/613* (2014.01)
*H01M 10/48* (2006.01)
*H01M 10/625* (2014.01)
*H01M 10/63* (2014.01)
*B60H 1/32* (2006.01)
*B60K 1/00* (2006.01)

(52) U.S. Cl.
CPC ............... *B60H 2001/3285* (2013.01); *B60K 2001/005* (2013.01); *B60L 2240/545* (2013.01); *H01M 2220/20* (2013.01)

(56) References Cited

U.S. PATENT DOCUMENTS

| | | | | |
|---|---|---|---|---|
| 2009/0317697 | A1* | 12/2009 | Dogariu | B60H 1/00278 |
| | | | | 429/62 |
| 2018/0050605 | A1* | 2/2018 | Lewis | B60K 11/02 |
| 2020/0240869 | A1* | 7/2020 | Yesh | G01M 3/38 |
| 2022/0396117 | A1* | 12/2022 | Kim | B60K 1/00 |

* cited by examiner

BATTERY COOLING SYSTEM CONTROL METHOD FOR VEHICLE

CROSS REFERENCE TO RELATED APPLICATIONS

This application claims priority to and the benefit of Korean Patent Application No. 10-2021-0190012 filed in the Korean Intellectual Property Office on Dec. 28, 2021, the entire contents of which are incorporated herein by reference.

BACKGROUND

(a) Field

The present disclosure relates to a battery cooling system control method for a vehicle. More particularly, the present disclosure relates to a battery cooling system control method for a vehicle for efficient cooling according to a temperature of a battery in an electric vehicle.

(b) Description of the Related Art

Generally, an air conditioning system for a vehicle includes an air conditioner which circulates a refrigerant to heat or cool an interior of the vehicle.

The air conditioner maintains a comfortable interior environment by maintaining an interior temperature of the vehicle at an appropriate temperature regardless of external temperature changes and is configured to heat or cool the interior of the vehicle by heat-exchange by an evaporator while the refrigerant discharged by driving a compressor circulates back to the compressor through a condenser, a receiver dryer, an expansion valve, and the evaporator.

In other words, in a cooling mode, the air conditioner lowers the interior temperature and humidity by condensing high-temperature, high-pressure gaseous refrigerant compressed from the compressor through the condenser and then evaporating it in the evaporator through the receiver dryer and expansion valve.

Recently, as interest in energy efficiency and environmental pollution issues is growing day by day, development of environment-friendly vehicles capable of substantially replacing internal combustion engine vehicles is required. The environment-friendly vehicles are classified into electric vehicles powered by generally fuel cells or electricity as power sources and hybrid vehicles powered by engines and batteries.

Among these environment-friendly vehicles, no separate heater is used in the electric vehicle or the hybrid vehicle unlike an air conditioning apparatus of a general vehicle, and an air conditioning apparatus applied to the environment-friendly vehicle is generally referred to as a heat pump system.

Meanwhile, a battery or a fuel cell is applied to the electric vehicle to supply electricity to a motor.

Here, since the battery applied to the electric vehicle generates driving torque by supplying charged electricity to a drive motor, it is indispensable to effectively remove heat generated from the battery in securing performance of the battery.

However, in the conventional electric vehicle, since it is difficult to efficiently manage temperature of the battery according to the temperature, unnecessary consumption of the charged electricity increases and the overall performance of the battery deteriorates, thereby shortening an entire travel distance of the vehicle. Thus, there were drawbacks such as a decrease in marketability of the electric vehicle.

Accordingly, there is a need for a control method for efficiently cooling the battery according to the temperature so that the battery exhibits the optimal performance.

The above information disclosed in this Background section is only for enhancement of understanding of the background of the disclosure, and therefore it may contain information that does not form the prior art that is already known in this country to a person of ordinary skill in the art.

SUMMARY

Therefore, to solve the above problems, the present disclosure has been made in an effort to provide a battery cooling system control method for a vehicle for efficiently cooling a battery in an electric vehicle by selectively using a coolant cooled in a radiator or a coolant heat-exchanged with a refrigerant circulating in an air conditioner according to a temperature of the battery.

To achieve the object, an exemplary embodiment of the present disclosure provides a battery cooling system control method for a vehicle including a process (A) of measuring by a controller a temperature of a battery based on data detected from a data detector while the vehicle is driving, determining by the controller whether the measured battery temperature is higher than a preset target temperature, and if a condition is not satisfied, cooling the battery using a coolant cooled in a radiator, and a process (B) of, if it is determined through the process (A) that the temperature of the battery is higher than the target temperature (i.e., if the condition is satisfied), operating an air conditioner to cool the battery using a coolant heat-exchanged with a refrigerant while passing through a chiller, and terminating control.

The process (A) may include measuring, by the controller, the temperature of the battery based on the data detected from the data detector while the vehicle is driving, determining, by the controller, whether the measured temperature of the battery is higher than the target temperature, in the determining of whether the temperature of the battery is higher than the target temperature, if it is determined that the temperature of the battery is lower than the target temperature (i.e., if the condition is not satisfied), determining, by the controller, whether the temperature of the battery is higher than a temperature of the coolant exhausted from the radiator, in the determining of whether the temperature of the battery is higher than the temperature of the coolant exhausted from the radiator, if it is determined that the temperature of the battery is higher than the temperature of the coolant exhausted from the radiator (i.e., if a condition is satisfied), opening, by the controller, a valve provided in a cooling apparatus, and operating, by the controller, at least one water pump.

In the determining of whether the temperature of the battery is higher than the temperature of the coolant exhausted from the radiator, if it is determined that the temperature of the battery is lower than the temperature of the coolant exhausted from the radiator (i.e., if the condition is not satisfied), the controller may perform operating a first water pump and return to the measuring of the temperature of the battery.

The process (A) may further include opening, by the controller, an active air flap provided in the vehicle in front of the radiator when the operating of the at least one water pump is completed.

The process (A) may further include operating, by the controller, a cooling fan disposed at the rear of the radiator when the operating of the at least one water pump is completed.

After the operating of the at least one water pump, the controller may return to the measuring of the temperature of the battery.

The process (B) may include controlling, by the controller, a valve provided in a cooling apparatus to close, and operating a second water pump, operating, by the controller, the air conditioner, and when the air conditioner is operated, operating, by the controller, a chiller expansion valve and terminating control.

The chiller expansion valve may expand a refrigerant supplied from the air conditioner according to a control signal of the controller to supplying it to the chiller, and the chiller may heat-exchange the expanded refrigerant with the coolant to lower a water temperature of the coolant.

The data detector may include a battery temperature sensor configured to measure the temperature of the battery, and a coolant temperature sensor configured to measure a temperature of the coolant exhausted from the radiator.

As described above, according to a battery cooling system control method for a vehicle according to an embodiment of the present disclosure, it is possible to efficiently manage a temperature of a battery in an electric vehicle by efficiently cooling the battery by selectively using a coolant cooled in a radiator or a coolant heat-exchanged with a refrigerant circulating in an air conditioner according to the temperature of the battery.

In addition, according to an embodiment of the present disclosure, it is possible to increase the entire travel distance of the vehicle through the efficient battery temperature management and to improve overall marketability of the electric vehicle.

DETAILED DESCRIPTION

Figure 1:
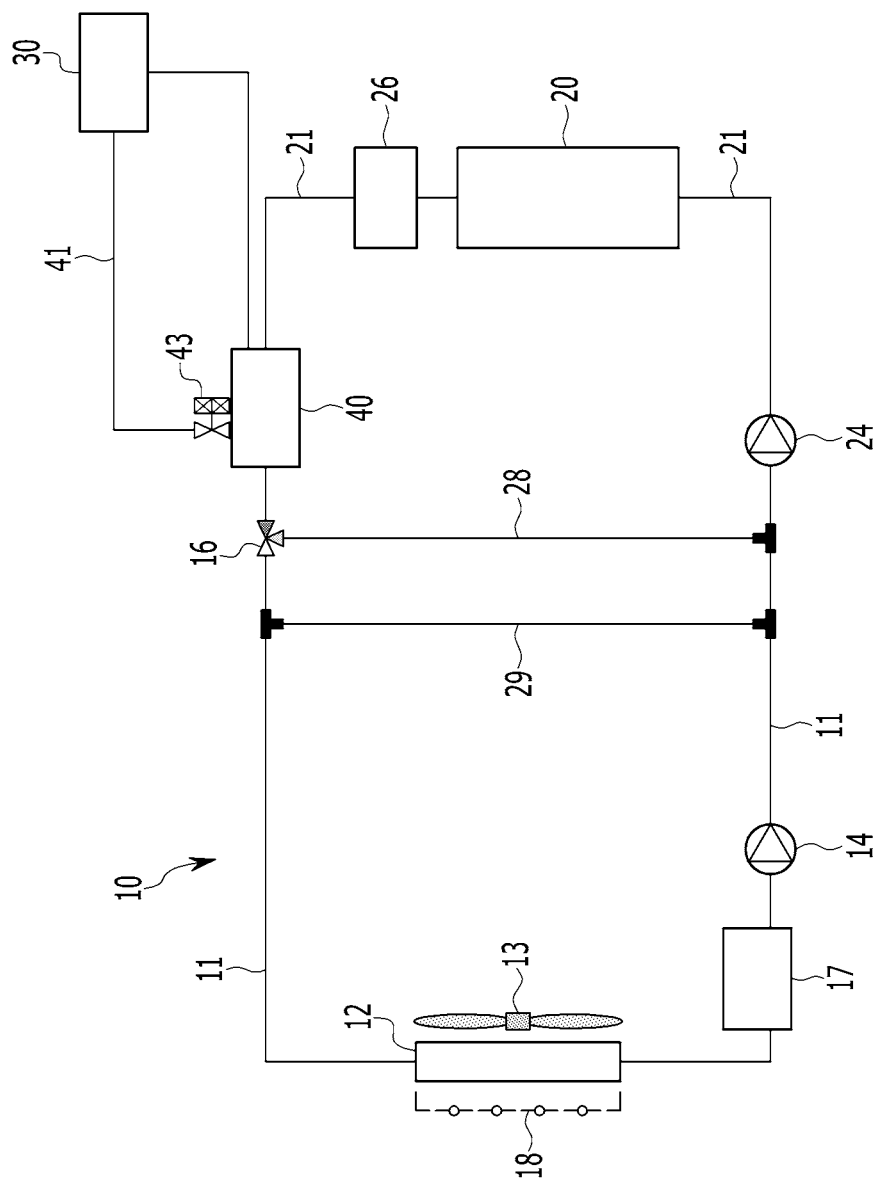
FIG. 1 is a block diagram of a battery cooling system for a vehicle according to an exemplary embodiment of the present disclosure.

An exemplary embodiment of the present disclosure will hereinafter be described in detail with reference to the accompanying drawings.

Prior to the description, it should be understood that exemplary embodiments described in the specification and configurations shown in the drawings are merely the most preferred exemplary embodiments of the present disclosure and that, since they do not represent all of the technical ideas of the present disclosure, there may be various equivalents and modifications that can be substituted for them at the time of filing the present application.

In addition, unless explicitly described to the contrary, the word "comprise", and variations such as "comprises" or "comprising", will be understood to imply the inclusion of stated elements but not the exclusion of any other elements, throughout the specification.

Further, terms such as " . . . unit", " . . . means", " . . . part", and " . . . member" described in the specification refer to a unit of a comprehensive configuration which performs at least one function or operation.

FIG. 1 is a block diagram of a battery cooling system for a vehicle according to an exemplary embodiment of the present disclosure.

A battery system for the vehicle according to the exemplary embodiment of the present disclosure may selectively use a coolant cooled in a radiator 12, or a coolant cooled in a chiller 40 which performs heat-exchange of a refrigerant and the coolant to efficiently cool a battery 20.

In the battery cooling system, a cooling apparatus 10 for cooling the battery 20 in an electric vehicle and an air conditioner 30 which is an air conditioning apparatus for cooling or heating the interior may be interconnected.

In other words, referring to FIG. 1, the battery cooling system includes the cooling apparatus 10, the battery 20, the air conditioner 30, and the chiller 40.

First, the cooling apparatus 10 includes the radiator 12 and a first water pump 14 connected to a coolant line 11.

The radiator 12 is disposed in the front of the vehicle, and a cooling fan 13 is provided at the rear of the radiator 12, to cool the coolant through operation of the cooling fan 13 and heat-exchange with outside air.

Further, a reservoir tank 17 is provided in the coolant line 11 between the radiator 12 and the first water pump 14. The coolant cooled in the radiator 12 may be stored in the reservoir tank 17.

In addition, an active air flap 18 for selective inflow of the outside air into the radiator 12 while the vehicle is driving may be provided in front of the radiator 12.

The active air flap 18 may be selectively opened or closed according to an external temperature and a temperature of the coolant.

The cooling apparatus 10 configured as above may circulate the coolant cooled in the radiator 12 along the first coolant line 11 through operation of the first water pump 14.

Here, the cooling apparatus 10 may selectively supply the coolant cooled in the radiator 12 to the battery 20.

In the exemplary embodiment, the battery 20 is provided in a battery coolant line 21 selectively connected to the coolant line 11 through a valve 16.

Here, the valve 16 may selectively connect the coolant line 11 and the battery coolant line 21 between the radiator 12 and the battery 20. This valve 16 may be a 3-way valve capable of distributing a flow rate.

More specifically, the valve 16 may selectively connect the coolant line 11 and the battery coolant line 21 between the radiator 12 and the chiller 40 provided in the battery coolant line 21.

Here, one end of the battery coolant line 21 may be connected to the valve 16, and the other end of the battery coolant line 21 may be connected to the coolant line 11 in which the first water pump 14 is disposed.

The battery 20 supplies power to electric components and motors provided in the vehicle and is formed as a water-cooled type which is cooled by the coolant flowing along the battery coolant line 21.

In other words, the battery 20 is selectively connected to the cooling apparatus 10 through the battery coolant line 21 according to operation of the valve 16.

Further, the coolant may be circulated in the battery 20 through operation of a second water pump 24 provided in the battery coolant line 21 or the operation of the first water pump 14.

The second water pump 24 operates to circulate the coolant through the battery coolant line 21.

Here, the first and second water pumps 14 and 24 may be electric water pumps.

In the present exemplary embodiment, the chiller 40 is provided in the battery coolant line 21, the coolant passes in the chiller 40, and the chiller 40 is connected to the air conditioner 30 through a chiller connection line 41.

The chiller 40 may heat-exchange the coolant selectively inflowing therein with the refrigerant supplied from the air conditioner 30 to control the temperature of the coolant. Here, the chiller 40 may be a water-cooled heat exchanger into which the coolant inflows.

Further, the chiller connection line 41 may be provided with a chiller expansion valve 43. The chiller expansion valve 43 is operated when the battery 20 is cooled with the coolant heat-exchanged with the refrigerant in the cooling mode of the vehicle.

The chiller expansion valve 43 may expand the refrigerant inflowing therein through the chiller connection line 41 and allow it to inflow into the chiller 40.

In other words, the chiller expansion valve 43 may further lower the water temperature of the coolant passing through the inside of the chiller 40 by expanding the refrigerant supplied from the air conditioner 30 and allowing it to inflow into the chiller 40 in the state in which its temperature is lowered.

Accordingly, the battery 20 may be cooled more efficiently because the coolant whose water temperature is lowered while passing through the chiller 40 inflows into the battery 20.

Here, the chiller expansion valve 43 may be an electronic expansion valve which selectively expands the refrigerant while controlling the flow of the refrigerant.

Further, a coolant heater 26 may be provided in the battery coolant line 21 between the battery 20 and the chiller 40.

The coolant heater 26 is turned on when temperature rising of the battery 20 is required to heat the coolant circulated in the battery coolant line 21, thereby allowing the coolant whose temperature has risen to inflow into the battery 20.

The coolant heater 26 may be an electric heater which operates according to power supply.

In addition, the battery coolant line 21 may be provided with a first branch line 28 for separating the cooling apparatus 10 and the battery coolant line 21 through the valve 16.

In other words, the first branch line 28 may selectively separate the coolant line 11 and the battery coolant line 21 according to the operation of the valve 16, so that the battery coolant line 21 forms a close and seal circuit independent of the cooling apparatus 10.

Further, the coolant line 11 is provided with a second branch line 29 for separating the battery coolant line 21 and the coolant line 11.

The second branch line 29 may be selectively connected to the coolant line 11 so that the cooling apparatus 10 forms an independent close and seal circuit through the coolant line 11.

In addition, a separate valve may be provided at a point where the second branch line 29 intersects with the coolant line 11 and the battery coolant line 21, or on the second branch line 29. The valve may be a 3-Way or 2-Way valve.

Accordingly, the valve 16 selectively connects the coolant line 11 and the battery coolant line 21 or selectively connects the battery coolant line 21 and the first branch line 28 to control the flow of the coolant.

In other words, in the case of cooling the battery 20 using the coolant cooled in the radiator 12, the first valve 16 may connect the coolant line 11 connected to the radiator 12 and the battery coolant line 21 and close the first branch line 28.

Then, the coolant cooled in the radiator 12 may flow along the coolant line 11 and the battery coolant line 21 connected through the operation of the valve 16 to cool the battery 20.

Further, the valve 16 may open the first branch line 28 and close the connection of the coolant line 11 and the battery coolant line 21, in the case of cooling the battery 20 using the coolant heat-exchanged with the refrigerant.

Accordingly, since the low-temperature coolant, which has completed heat-exchange with the refrigerant in the chiller 40, flows into the battery 20 through the first branch line 28 opened by the valve 16, the battery 20 may be efficiently cooled.

Meanwhile, in the case of rising the temperature of the battery 20, the valve 16 may open the first branch line 28 and block the connection between the coolant line 11 and the battery coolant line 21.

Then, it is possible to prevent the coolant circulating along the battery coolant line 21 and the first branch line 28 from inflowing into the radiator 12.

At this time, if the coolant heater 26 is operated, the coolant circulating along the battery coolant line 21 and the first branch line 28 may inflow into the battery 20 in a heated state. Accordingly, the temperature of the battery 20 may rapidly rise by the heated coolant.

On the other hand, in the present exemplary embodiment, a configuration in which no valve is provided in the second branch line 29 is described as an exemplary embodiment, but the present disclosure is not limited thereto. For selective opening of the second branch line 29, it is possible to apply a valve as needed.

In other words, since the second branch line 29 may control the flow rate of the coolant circulated through the coolant line 11, the battery coolant line 21, and the first branch line 28 which are selectively connected according to each mode of the vehicle (heating, cooling, dehumidification) and through the operation of the first and second water pumps 14 and 24, it is possible to control opening and closing of the second branch line 29.

Hereinafter, a method for controlling a battery cooling system for a vehicle configured as described above will be described with reference to FIGS. 2 and 3.

Figure 2:
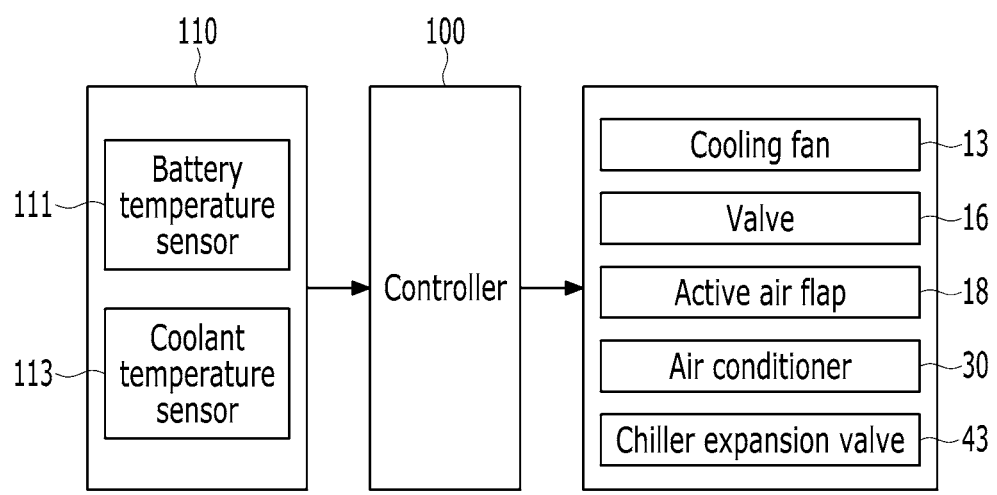
FIG. 2 is a block diagram illustrating a battery cooling system control apparatus to which a battery cooling system control method for a vehicle according to an exemplary embodiment of the present disclosure is applied.
Figure 3:
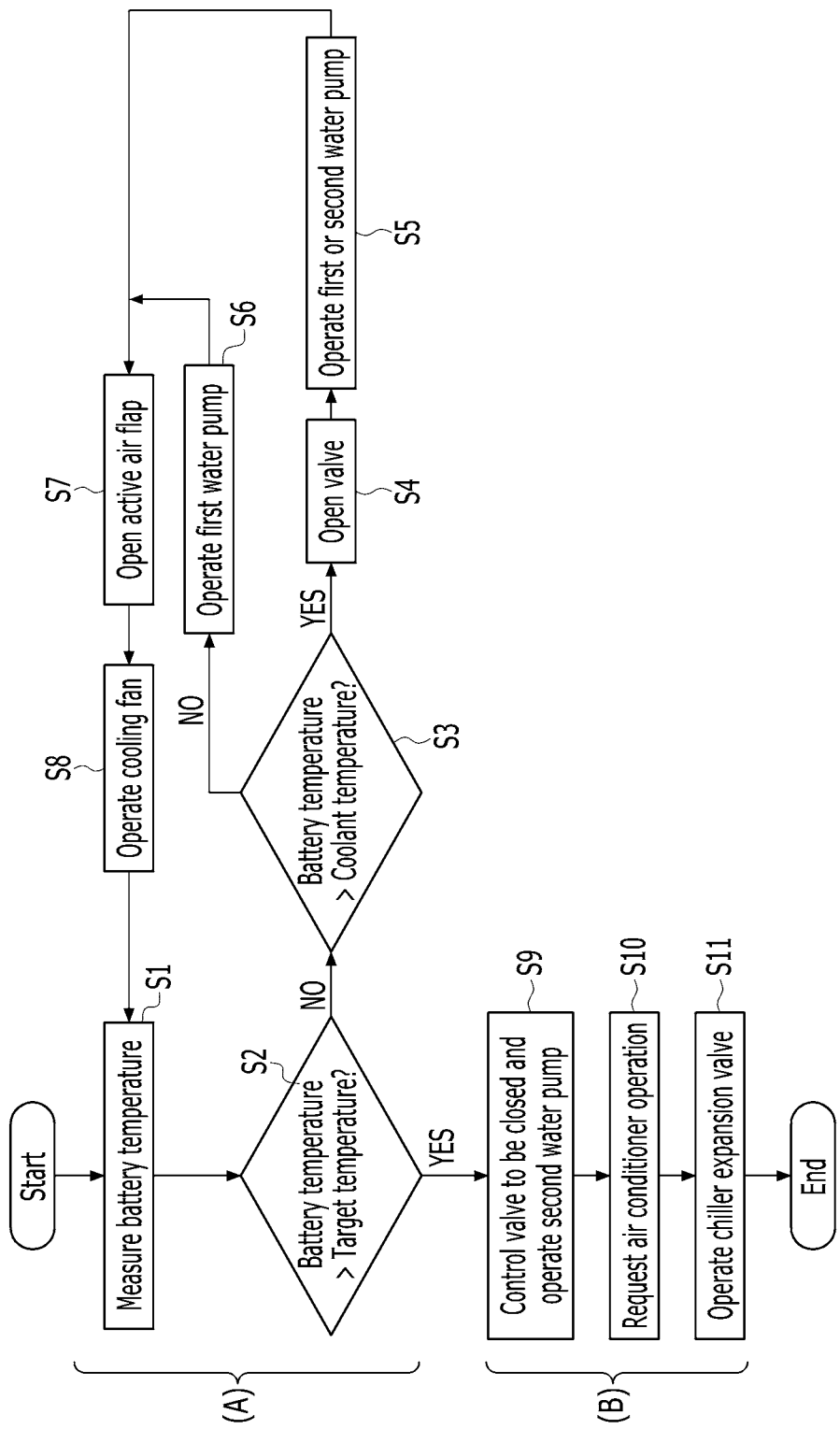
FIG. 3 is a control flowchart illustrating a battery cooling system control method for a vehicle according to an exemplary embodiment of the present disclosure.

FIG. 2 is a block diagram illustrating a battery cooling system control apparatus to which a battery cooling system control method for a vehicle is applied according to an exemplary embodiment of the present disclosure, and FIG. 3 is a control flowchart illustrating a battery cooling system control method for a vehicle according to an exemplary embodiment of the present disclosure.

Referring to the drawings, a battery cooling system control method for a vehicle according to an exemplary embodiment of the present disclosure is controlled by a controller 100 and is applied to an electric vehicle to which the above-described battery cooling system for the vehicle (see FIG. 1) is applied.

As shown in FIG. 2, the battery cooling system may be controlled by a battery cooling system control apparatus, and the battery cooling system control apparatus may include the controller 100 and a data detector 110.

Here, the data detector 110 may detect data for efficiently cooling the battery 20 according to the temperature of the battery 20 from the battery cooling system.

The data detected by the data detector 110 is transmitted to the controller 100. The data detector 110 may include a battery temperature sensor 111 and a coolant temperature sensor 113.

First, the battery temperature sensor 111 measures the temperature of the battery 20 and transmits a signal corresponding thereto to the controller 100.

The coolant temperature sensor 113 may measure the temperature of the coolant exhausted from the radiator 12 and transmit a signal corresponding thereto to the controller 100.

The controller 100 may control the cooling fan 13, the valve 16, the active air flap 18, the air conditioner 30, and the chiller expansion valve 43 to efficiently cool the battery 20 according to the temperature of the battery 20 based on the data detected by the data detector 110.

Here, a battery cooling system control method for a vehicle according to an exemplary embodiment of the present disclosure selectively uses the coolant cooled in the radiator 12, or the coolant heat-exchanged with the refrigerant in the chiller 40 to which the refrigerant is supplied from the air conditioner 30 according to the temperature of the battery 20 in the electric vehicle to efficiently cool the battery 20.

To this end, as shown in FIG. 3, a battery cooling system control method for a vehicle according to an exemplary embodiment of the present disclosure may include (A) measuring the temperature of the battery 20 by the controller 100 based on data detected from the data detector 110 while the vehicle is driving, determining by the controller 100 whether the measured battery temperature is higher than a preset target temperature, and if a condition is not satisfied, cooling the battery 20 using the coolant cooled in the radiator 12, and (B) if it is determined through the process (A) that the battery temperature is higher than the target temperature (i.e., if the condition is satisfied), operating the air conditioner 30 to cool the battery 20 using the coolant heat-exchanged with the refrigerant while passing through the chiller 40 and terminating control.

The process (A) may include the following steps. First, while the vehicle is driving, the controller 100 measuring the temperature of the battery 20 by based on an output signal output from the data detector 110 at S1.

Then, the controller 100 determines whether the temperature of the battery 20 measured in the step S1 of measuring the temperature of the battery 20 is higher than the set target temperature at S2. Here, the target temperature may be about 36° C.

In the step S2 of determining whether the temperature of the battery 20 is higher than the target temperature, if it is determined that the temperature of the battery 20 is lower than the target temperature (i.e., if the condition is not satisfied), the controller 100 determines whether the temperature of the battery 20 is higher than the temperature of the coolant exhausted from the radiator 12 at S3.

In the step S3 of determining whether the temperature of the battery is higher than the temperature of the coolant exhausted from the radiator, if it is determined that the temperature of the battery 20 is higher than the temperature of the coolant exhausted from the radiator 20 (i.e., if a condition is satisfied), the controller 100 controls the valve 16 provided in the cooling apparatus 10 to open at S4.

Here, when the controller 100 controls the valve 16 to open, the first branch line 28 may be closed, and the coolant line 11 and the battery coolant line 21 may be interconnected by the operation of the valve 16. At this time, the second branch line 29 may be closed.

Then, the controller 100 operates the first water pump 14 or the second water pump 24 so that the coolant cooled in the radiator 12 is supplied to the battery 20 at S5.

Thus, the coolant cooled in the radiator 12 may cool the battery 20 while circulating along the coolant line 11 and the battery coolant line 21 by the operation of the first water pump 14 or the second water pump 24.

When the step S5 of operating the first water pump 14 or the second water pump 24 is completed, the controller 100 may return to the step S1 of measuring the temperature of the battery 20.

On the other hand, in the step S3 of determining whether the temperature of the battery 20 is higher than the temperature of the coolant exhausted from the radiator 12, if it is determined that the temperature of the battery 20 is lower than the temperature of the coolant exhausted from the radiator 12 (i.e., if the condition is not satisfied), the controller 100 may operate the first water pump 12 at S6.

At this time, the valve 16 may be controlled to close by a control signal from the controller 100 so that the coolant line 11 and the battery coolant line 21 are not connected.

Accordingly, the coolant line 11 may be separated from the battery coolant line 21 to form an independent close and seal circuit through the second branch line 29.

Then, the coolant may be circulated along the coolant line 11 and the second branch line 29 and cooled through heat-exchange with the outside air while repeatedly passing through the radiator 12.

When the step S6 of operating the first water pump 12 is completed, the controller 100 may return to the step S1 of measuring the temperature of the battery 20.

On the other hand, in the present exemplary embodiment, the process (A) may further include a step of opening the active air flap 18 provided in the vehicle in front of the radiator 12 by the controller 100 at S7 when the step S5 of operating the first water pump 14 or the second water pump 24 or the step S6 of operating the first water pump 14 is completed.

In other words, when the active air flap 18 is opened by the controller 100 in the step S7, the outside air inflowing into the radiator 12 increases, so that the coolant passing through the radiator 12 may be cooled rapidly.

Further, the process (A) may further include a step of operating the cooling fan 13 disposed at the rear of the radiator 12 by the controller 100 at S8 when the step S5 of operating the first water pump 14 or the second water pump 24 or the step S6 of operating the first water pump 14 is completed.

When the cooling fan 13 is operated by the controller 100 in the step S8, the amount of air blown from the cooling fan 13 to the radiator 12 increases, so that the coolant passing through the radiator 12 may be cooled rapidly.

Meanwhile, in the present exemplary embodiment, it is described as an exemplary embodiment that both the cooling fan 13 and the active air flap 18 are sequentially operated, but the present disclosure is not limited thereto. Either the cooling fan 13 or the active air flaps 18 may be selectively operated.

In other words, the process (A) may cool the battery 20 efficiently using the coolant cooled in the radiator 12 according to the temperature of the battery 20 while repeating the operations as described above.

On the other hand, if it is determined that the temperature of the battery 20 is higher than the target temperature (i.e., if the condition is satisfied) in the step S2 of determining whether the temperature of the battery 20 is higher than the target temperature, the controller 100 may perform the process (B).

In the present exemplary embodiment, the process (B) may include the following steps. First, the controller 100 controls the valve 16 provided in the cooling apparatus 10 to close, and operates the second water pump 24 at S9.

Here, the valve 16 may operate so that the coolant line 11 is not connected to the battery coolant line 21, and may open the first branch line 28.

Then, the battery coolant line 21 is separated from the coolant line 11. Accordingly, the battery coolant line 21 may form an independent close and seal circuit through the first branch line 28.

In this state, the coolant may be circulated along the battery coolant line 21 and the first branch line 28 by the operation of the second water pump 24.

When the step S9 of controlling the valve 16 to close and operating the second water pump 24 is completed, the controller 100 operates the air conditioner 30 at S10.

Then, when the air conditioner 30 is operated, the controller 100 may operate the chiller expansion valve 43 at S11 and terminate control.

Here, the chiller expansion valve 43 may expand the refrigerant supplied from the air conditioner 30 through the chiller connection line 41 and supply it to the chiller 40.

Accordingly, the chiller 40 may heat-exchange the expanded refrigerant with the coolant inflowing along the battery coolant line 21 to lower the water temperature of the coolant.

The coolant whose temperature is lowered is supplied to the battery 20 while circulating along the battery coolant line 21 and the first branch line 28, thereby rapidly cooling the overheated battery 20.

The battery cooling system control method configured as above may rapidly cool the battery 20 by selectively using the coolant cooled in the radiator 12, or the coolant heat-exchanged with the refrigerant in the chiller 40 according to the temperature of the battery 20 while performing each of the above-described steps repeatedly.

Therefore, if the battery cooling system control method for the vehicle according to an exemplary embodiment of the present disclosure configured as described above is applied, it is possible to manage efficiently the temperature of the battery 20 in the electric vehicle by selectively using the coolant cooled in the radiator 12 or the coolant heat-exchanged with the refrigerant circulating in the air conditioner 30 according to the temperature of the battery 20 to cool the battery 20 efficiently.

Further, according to the present disclosure, it is possible to increase the entire travel distance of the vehicle through efficient temperature management of the battery 20 and to improve the overall marketability of the electric vehicle.

As described above, although the present disclosure has been described with reference to limited exemplary embodiments and drawings, the present disclosure is not limited thereto, and various modifications and variations are, of course, possible within the technical spirit of the present disclosure and the range of equivalents of the appended claims to be described below by those skilled in the art to which the present disclosure pertains.

The invention claimed is:

1. A battery cooling system control method for a vehicle, the method comprising:
   a process (A) comprising:
      measuring, by a controller, a temperature of a battery based on data detected from a data detector while the vehicle is driving;
      determining, by the controller, whether the measured battery temperature is higher than a preset target temperature, and if a condition is not satisfied, cooling the battery using a coolant cooled in a radiator;
      in the determining of whether the temperature of the battery is higher than the target temperature, if it is determined that the temperature of the battery is lower than the target temperature, determining, by the controller, whether the temperature of the battery is higher than a temperature of the coolant exhausted from the radiator;
      in the determining of whether the temperature of the battery is higher than the temperature of the coolant exhausted from the radiator, if it is determined that the temperature of the battery is higher than the temperature of the coolant exhausted from the radiator, opening, by the controller, a valve provided in a cooling apparatus; and
      operating, by the controller, at least one water pump; and
   a process (B) comprising:
      if it is determined through the process (A) that the temperature of the battery is higher than the target temperature, operating an air conditioner to cool the battery using a coolant heat-exchanged with a refrigerant while passing through a chiller; and
      terminating control by the controller.

2. The method of claim 1, wherein:
   in the determining of whether the temperature of the battery is higher than the temperature of the coolant exhausted from the radiator,
   if it is determined that the temperature of the battery is lower than the temperature of the coolant exhausted from the radiator, the controller operates a first water pump and returns to the measuring of the temperature of the battery.

3. The method of claim 1, wherein the process (A) further comprises:
   opening, by the controller, an active air flap provided in the vehicle in front of the radiator when the operating of the at least one water pump is completed.

4. The method of claim 1, wherein the process (A) further comprises:
   operating, by the controller, a cooling fan disposed at the rear of the radiator when the operating of the at least one water pump is completed.

5. The method of claim 1, wherein, after the operating of the at least one water pump, the controller returns to the measuring of the temperature of the battery.

6. The method of claim 1, wherein:
   the process (B) further comprises:
      controlling, by the controller, a valve provided in a cooling apparatus to close, and
   operating a second water pump;
      operating, by the controller, the air conditioner; and
      when the air conditioner is operated, operating, by the controller, a chiller expansion valve and terminating control by the controller.

7. The method of claim 6, wherein the chiller expansion valve expands the refrigerant supplied from the air conditioner according to a control signal of the controller to supplying it to the chiller, and the chiller heat-exchanges the expanded refrigerant with the coolant to lower a water temperature of the coolant.

8. The method of claim 1, wherein the data detector comprises:
   a battery temperature sensor configured to measure the temperature of the battery; and
   a coolant temperature sensor configured to measure a temperature of the coolant exhausted from the radiator.

* * * * *